| (12) | United States Patent | (10) Patent No.: | US 9,310,044 B2 |
|---|---|---|---|
| | Pusch et al. | (45) Date of Patent: | Apr. 12, 2016 |

(54) MOTOR VEHICLE TAILLIGHT

(71) Applicant: Hella KGaA Hueck & Co., Lippstadt (DE)

(72) Inventors: Frank Pusch, Vienenburg (DE); Thorsten Ruths, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 222 days.

(21) Appl. No.: 14/102,817

(22) Filed: Dec. 11, 2013

(65) Prior Publication Data

US 2014/0160779 A1    Jun. 12, 2014

(30) Foreign Application Priority Data

Dec. 12, 2012   (DE) .......................... 10 2012 112 151

(51) Int. Cl.
  *F21S 8/10*   (2006.01)
  *B60Q 1/44*   (2006.01)
  *B60Q 1/26*   (2006.01)

(52) U.S. Cl.
  CPC ............ *F21S 48/236* (2013.01); *B60Q 1/2607* (2013.01); *F21S 48/215* (2013.01); *F21S 48/225* (2013.01); *F21S 48/2243* (2013.01); *F21S 48/2262* (2013.01); *F21S 48/2268* (2013.01); *F21S 48/2281* (2013.01); *F21S 48/25* (2013.01)

(58) Field of Classification Search
  CPC . F21S 48/225; F21S 48/2281; F21S 48/2607; F21S 48/215; F21S 48/2243; F21S 48/2262; F21S 48/2268; F21S 48/25; F21S 48/236; B60Q 1/2607

See application file for complete search history.

(56) References Cited

U.S. PATENT DOCUMENTS

| 7,407,303 | B2* | 8/2008 | Wanninger | G02B 6/003 362/227 |
|---|---|---|---|---|
| 7,963,685 | B2* | 6/2011 | Kowalczyk | B60Q 1/2607 362/540 |
| 2008/0225542 | A1* | 9/2008 | Mertens | B60Q 1/0058 362/517 |
| 2010/0246200 | A1* | 9/2010 | Tessnow | F21S 48/2237 362/509 |
| 2011/0110111 | A1* | 5/2011 | Rho | F21S 48/1154 362/509 |
| 2012/0250343 | A1* | 10/2012 | Koizumi | F21S 48/215 362/511 |

FOREIGN PATENT DOCUMENTS

| DE | 102 14 505 | 10/2003 |
|---|---|---|
| DE | 10 2010 049 422 | 4/2012 |

* cited by examiner

*Primary Examiner* — Alan Cariaso
(74) *Attorney, Agent, or Firm* — Gerald E. Hespos; Michael J. Porco; Matthew T. Hespos

(57) ABSTRACT

A motor vehicle taillight (10) has at least a rear position light function, a turn signal light function, and a brake light function. The rear position light function and the turn signal light function are formed by a common first optical waveguide (15) and by first LED light sources (16, 17) that inject light into the first optical waveguide (15). The brake light function is formed by at least two second optical waveguides (23) and by second LED light sources (24) that inject light into the optical waveguides (23). The second optical waveguides (23) border the first optical waveguide (15) on at least two sides.

10 Claims, 2 Drawing Sheets

MOTOR VEHICLE TAILLIGHT

CROSS REFERENCE TO RELATED APPLICATION

This application claims priority under 35 USC 119 to German Patent Appl. No. 10 2012 112 151.6 filed on Dec. 12, 2012, the entire disclosure of which is incorporated herein by reference.

BACKGROUND

1. Field of the Invention

The invention relates to a motor vehicle taillight that has at least a rear position light function, a turn signal function and a brake light function.

2. Description of the Related Art

Motor vehicle taillights may have a plurality of light functions, such as a rear position light function, a brake light function, a turn signal function, a reversing light function, and a rear fog light function. These functions typically are made available by corresponding light sources of the motor vehicle taillight.

DE 102 14 505 A1 discloses a motor vehicle taillight that provides at least a rear position light function, a brake light function, a turn signal function, and a reversing light function. At least some of these light functions employ LEDs as light sources.

DE 10 2010 049 422 A1 discloses an illumination device for a motor vehicle that has an optical waveguide made of a transparent material. Light emitted by a light source can be coupled into a first surface of the optical waveguide and can be coupled out of a second surface of the optical waveguide. The optical waveguide here has the shape of a hollow cone and is configured to be rotationally symmetric with respect to a cone axis. The illumination device having such an optical waveguide provides various light functions, such as a rear position light, turn signal light and brake light.

An object of the invention is to provide a novel motor vehicle taillight.

SUMMARY OF THE INVENTION

The invention relates to a motor vehicle taillight with first and second optical waveguides. Two first LED light sources inject light into the first optical wave guide to perform a rear position light function and a turn signal light function. A second LED light source injects light into the second optical wave guide to perform a brake light function. The second optical waveguide borders the first optical waveguide on at least two sides.

The second optical waveguide preferably is positioned at least above and below the first optical waveguide. As a result, a novel appearance of a motor vehicle taillight and thus a novel identification feature for a vehicle are provided. The brake light function requires a relatively high luminous intensity and for the first time is realized by optical waveguides in combination with LED light sources.

The first optical waveguide, which provides the rear position light function and the turn signal function, preferably is configured to resemble a T in cross-section. Coupling-in optical means are provided for coupling in light and are formed at vertically extending limbs thereof. A coupling-out optical means is formed at a horizontally extending limb of the first optical waveguide. A total internal reflection surface is formed in transitions between the vertically extending limbs and the horizontally extending limb to redirect the light that is coupled into the vertically extending limbs into the horizontally extending limb. The T-type configuration of the first optical waveguide permits a particularly advantageous coupling of light into and out of the optical waveguide.

Each second optical waveguide provides the brake light function and at least portions preferably have an L-shaped cross-section. A coupling-in optical means preferably is formed at vertically extending limbs of each second optical wave guide for coupling in light, and a coupling-out optical means preferably is formed at horizontally extending limbs of each second optical wave guide for coupling out light. A total internal reflection surface preferably is formed in transition portions between the vertically extending limbs and the horizontally extending limbs to redirect the light coupled into the respective vertically extending limb into the respective horizontally extending limb. The L-shape cross-section of each second optical waveguide permits a particularly advantageous coupling in and out of light.

The LED light sources that provide the brake light function are preferably positioned next to one another with a spacing of 10 to 20 mm. The spacing of the LED light sources that provide the brake light function ensure a homogeneous brake light with high luminous intensity.

A cover plate functions for the exit of light and is contoured three-dimensionally to resemble an E in cross-section. The second optical waveguide preferably projects into a top covering segment of the cover plate and into a bottom covering segment of the cover plate, and the optical waveguide preferably projects into a central covering segment of the cover plate. The cover plate further differentiates a motor vehicle and thus provides a novel identification feature.

Exemplary embodiments of the invention are illustrated with reference to the drawing, without being limited thereto.

DETAILED DESCRIPTION OF THE PREFERRED EMBODIMENTS

Figure 1:
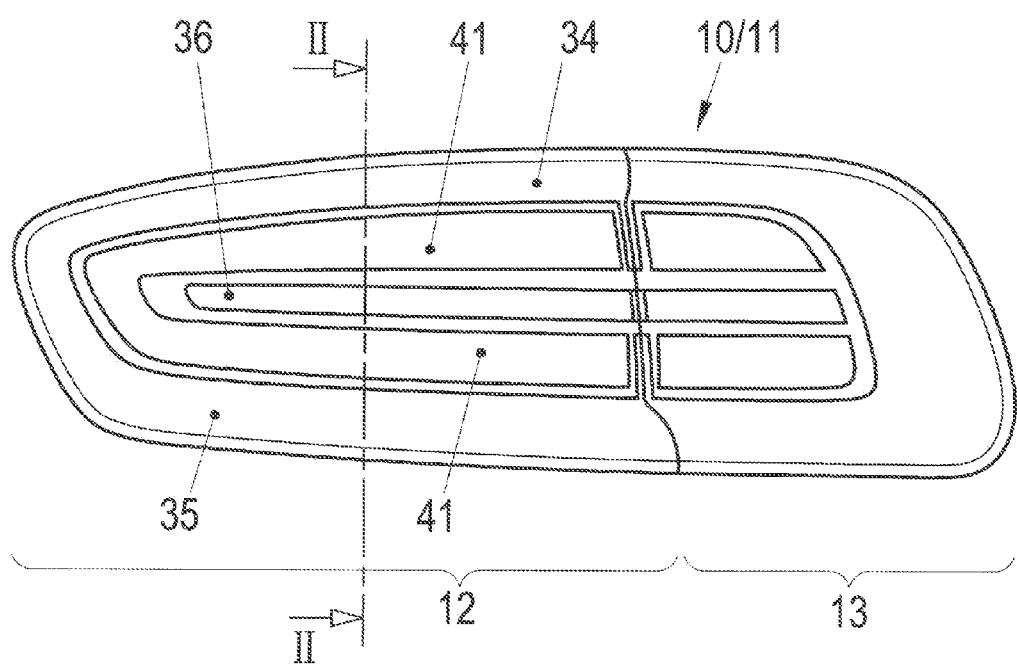
FIG. 1 is a front view of a motor vehicle taillight according to the invention.

A motor vehicle taillight according to the invention is identified by the numeral 10 in FIG. 1. The motor vehicle taillight 10 has a cover plate 11. A first part 12 of the motor vehicle taillight 10 is integrated in a positionally fixed lateral part of a motor vehicle body, while a second part 13 of the motor vehicle taillight 10 is integrated in a movable tailgate of the motor vehicle body. The two parts 12 and 13 of the motor vehicle taillight 10 are displaceable relative to one another as the tailgate is opened and closed. However, the motor vehicle taillight 10 also can be configured as one part that is integrated in a positionally fixed lateral part of a motor vehicle body.

Figure 2:
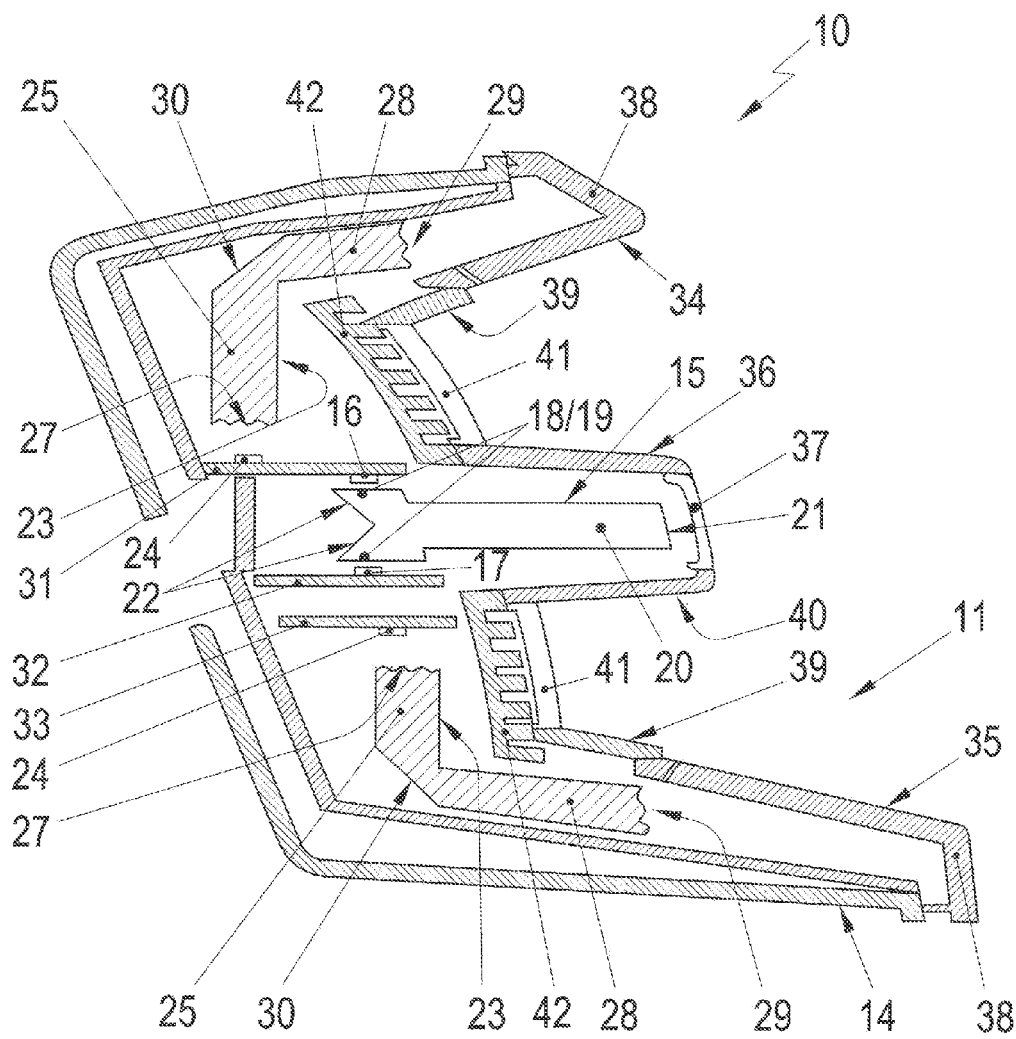
FIG. 2 is a cross-section along the section line II-II of FIG. 1.

The motor vehicle taillight 10 also has a rear-side housing 14, as shown in FIG. 2, and assemblies of the motor vehicle taillight 10 are positioned between the rear-side housing 14 and the cover plate 11. More particularly, the rear position light function and the turn signal light function of the motor vehicle taillight 10 are formed by a first, common optical waveguide 15 and by first and second LED light sources that inject light into the first optical waveguide 15. The first LED light sources 16 emit light for the rear position light function and second LED light sources 17 emit light for the turn signal light function.

As can be seen in FIG. 2, the first optical waveguide 15, which provides the rear position light function and the turn signal light function, resembles a T in cross-section.

Coupling-in optical means 19 are formed at vertically extending limbs 18 of the first optical waveguide 15 for coupling in the light emitted by the LED light sources 16, 17, and a coupling-out optical means 21 is formed at a horizontally extending limb 20 of said first optical waveguide 15 for coupling out to the surroundings the light that had been coupled into the optical waveguide 15, out of said optical waveguide 15. The coupling-in optical means 19 and the coupling-out optical means 21 preferably are Fresnel structures. Total internal reflection surfaces 22 are formed in transition portions between the vertically extending limbs 18 and the horizontally extending limb 20 to redirect the light coupled into the vertically extending limb 18 into the horizontally extending limb 20 of the first optical waveguide 15.

The brake light function of the motor vehicle taillight 10 is provided by second optical waveguides 23 and by LED light sources 24 that interact with each second optical waveguide 23. The LED light sources 24 for the brake light function inject light into each second optical waveguide 23.

The optical waveguides 23 that provide the brake light function are positioned at least above and below the first optical waveguide 15, which provides the rear position light function and the turn signal light function, such that an optical viewing region for the brake light surrounds, encloses or borders the optical viewing region for the rear position light and the turn signal light at least on two sides.

The illustrated motor vehicle taillight 10 has two parts, and the viewing region for the rear position light and the turn signal light is bordered in each part 11, 12 by the viewing region for the brake light on three sides, specifically the top, the bottom and the sides of the two parts 11, 12 that face away from each other.

If the motor vehicle taillight 10 is configured as one part, the viewing region for the rear position light and the turn signal light preferably is bordered by the viewing region for the brake light on four sides, specifically the top, the bottom and both sides.

Each second optical waveguide 23 provides the brake light function and is configured to resemble an L in cross-section or has sections contoured to resemble an L in cross-section. Each second optical waveguide 23 has a coupling-in optical means 27 formed at vertical limbs 25 to couple the light emitted by the LED light sources 24 for the brake light function into each second optical waveguide 23. Coupling-out optical means 29 are formed at horizontal limbs 28 so that the light that is guided by each second optical waveguide 23 can be output or coupled out of said optical waveguide 23. The coupling-in optical means 27 and the coupling-out optical means 29 preferably are Fresnel structures. Total internal reflection surfaces 30 are formed in transitions between the vertical limbs 25 and the horizontal limbs 28 of each second optical waveguide 23 to redirect the coupled-in light from each vertical limb 25 into the respective horizontal limb 28.

A first of the second optical waveguides 23b, which provides the brake light function, is positioned above the first optical waveguide 15, which provides the rear position light function and the turn signal function. A second of the second optical waveguides 23, which provides the brake light function, is arranged below the first optical waveguide 15, which provides the rear position light function and the turn signal light function. A third of the second optical waveguides 23, which provides the brake light function, is arranged on at least one side laterally next to the first optical waveguide 15, which provides the brake light function and the turn signal light function.

In a first variant, separate optical waveguides 23 are configured to resemble an L.

According to a second variant, a single, one-part optical waveguide 23 has plural sections configured to resemble an L is present.

A circuit board 31 is positioned between the first optical waveguide 15 and one of the second optical waveguides 23. A first side of the circuit board 31 carries the LED light sources 24 for the brake light function and a second side carries the LED light sources 16 for the rear position light function.

In the illustrated embodiment, a circuit board 32 carries the LED light sources 24 for the turn signal light function, and a circuit board 33 carries LED light sources 24 for the brake light function. The circuit boards 32 and 33 are between the first optical wave guide 15 and one of the second optical waveguides 23.

The circuit board 32 with the separate LED light sources 17 for the turn signal light function can be omitted if the rear position light function and the turn signal light function can be provided in a common light color.

Light is coupled in using the LED light sources 16, 17, 24, and 27 in a central region of the motor vehicle taillight 10 between the vertical limbs 25 of each second optical waveguide 23 and the vertical limbs 18, 19 of the first optical waveguide 15.

The brake light function provided via the optical waveguides 23 and the LED light sources 24 borders the rear position light function and the turn signal function provided by the optical waveguide 15 and the LED light sources 16, 17.

Each optical waveguide 23 for the brake light function has an L cross-section and a total internal reflection surface 30 for redirecting the light that is coupled into the optical waveguide 23 via the vertical limb 25 into the horizontal limb 28.

The LED light sources 24 that provide the brake light function are positioned next to one another with a spacing of 10 mm to 20 mm, preferably with a spacing of 15 mm to 20 mm, to provide a brake light having a sufficient luminous intensity and a homogeneous light distribution.

The cover plate 11 of the motor vehicle taillight 10 is three-dimensionally contoured to resemble an E in cross-section. The horizontal limbs 28 of the second optical waveguides 23 provide the brake light function and project respectively into top and bottom covering segments 34 and 35 of the E-shaped cover plate 11.

The horizontal limb 20 of the first optical waveguide 15 projects into a middle covering segment 36 of the E-shaped cover plate 11 to provide the rear position light function and the turn signal light function.

A vertically extending section 37 of the middle covering segment 36 and angled sections 38 of the top and bottom covering segments 34 and 35 of the E-shaped cover plate 11 are made of a light-transmissive material so that light coupled out of the optical waveguides 15 and 23 can be emitted into the surroundings of the motor vehicle.

In contrast, sections 39 and 40 of the covering segments 34, 35, and 36 of the E-shaped cover plate 11 extend substantially horizontally and are made of an opaque material.

Covering segments 41 extend substantially vertically between the covering segments 34 and 36 and between the covering segments 35 and 40. The covering segments can be made of a transparent or translucent material, and three-dimensionally contoured visible components 42 are positioned behind the segments 41. The visible components 42 function for further optical differentiation of the motor vehicle taillight 10.

What is claimed is:

1. A motor vehicle taillight having at least a rear position light function, a turn signal light function and a brake light function, comprising:
   a first optical waveguide and first LED light sources that inject light into the first optical waveguide to carry out the rear position light function and the turn signal light function; and
   at least two second optical waveguides and second light sources that inject light into the second optical waveguides to carry out the brake light function, the second optical waveguides bordering the first optical waveguide on at least two sides, wherein
   the first optical waveguide has a T-shape cross-section with two vertical limbs formed respectively with coupling-in optical surfaces for coupling in light and a horizontal limb with a coupling-out optical end, two total internal reflection surface formed in transition portions between the vertical limbs and the horizontal limb to redirect the light that is coupled into the vertical limbs into the horizontally extending limb.

2. The motor vehicle taillight of claim 1, wherein each of the second optical waveguides has an L-shaped cross-section with vertical limb with a coupling-in optical end for coupling in light, a horizontal limb with a coupling-out optical end and a total internal reflection surface in a transition portion between the vertical limb and the horizontal limb to redirect the light that is coupled into the respective vertical limb into the respective horizontal limb.

3. The motor vehicle taillight of claim 2, further comprising a first circuit board between the first optical wave guide and an upper one of the second optical waveguides, at least one of the first LED light sources being on a first side of the first circuit board and at least an upper one of the second LED light sources being on a second side of the first circuit board.

4. The motor vehicle taillight of claim 3, further comprising a second circuit board between the first optical waveguide and a lower one of the second optical waveguides at least a lower one of the second LED light sources being on the second circuit board.

5. The motor vehicle taillight of claim 4, further comprising a third circuit board between the second circuit board and the first optical waveguide, at least one of the first LED light sources being on the third circuit board.

6. The motor vehicle taillight of claim 1, wherein the second LED light sources are positioned next to one another with a spacing of 10 to 20 mm.

7. A motor vehicle taillight having at least a rear position light function, a turn signal light function and a brake light function, comprising:
   a first optical waveguide and first LED light sources that inject light into the first optical waveguide to carry out the rear position light function and the turn signal light function;
   at least two second optical waveguides and second light sources that inject light into the second optical waveguides to carry out the brake light function, the second optical waveguides bordering the first optical waveguide on at least two sides; and
   a cover plate through which light of the first and second optical waveguides exits, the second optical waveguides projecting light into a top and bottom covering segments of the cover plate, and the first optical waveguide projecting light into a central covering segment of the cover plate between the top and bottom covering segments.

8. The motor vehicle taillight of claim 7, wherein substantially vertical sections of the covering segments are made of a light-transmissive material, and wherein substantially horizontal sections of the covering segments are made at least sectionally of an opaque material.

9. The motor vehicle taillight of claim 7, wherein the cover plate further comprises substantially vertical intermediate covering segments made of a transparent or translucent material and positioned between the covering segments into which the optical waveguides project, and a three-dimensionally contoured visible component is positioned behind the intermediate covering segments.

10. The motor vehicle taillight of claim 7, wherein the cover plate is substantially E-shaped.

* * * * *